US 8,245,294 B1
Aug. 14, 2012

(12) United States Patent
Zahra et al.

(54) NETWORK BASED VIRUS CONTROL

(75) Inventors: Andrew Zahra, Farmborough Heights (AU); Alan James Boswell, Forbes (AU); Nguyen Tran, Sutherland (AU); Peter Nicholson, Bulli (AU)

(73) Assignee: Avaya, Inc., Basking Ridge, NJ (US)

( * ) Notice: Subject to any disclaimer, the term of this patent is extended or adjusted under 35 U.S.C. 154(b) by 1695 days.

(21) Appl. No.: 10/995,652

(22) Filed: Nov. 23, 2004

(51) Int. Cl.
*G06F 12/14* (2006.01)
*G06F 12/16* (2006.01)
*G06F 7/04* (2006.01)
*G08B 23/00* (2006.01)

(52) U.S. Cl. .................. 726/22; 726/23; 726/24; 726/25

(58) Field of Classification Search .................... 726/22, 726/23, 24, 25
See application file for complete search history.

(56) References Cited

U.S. PATENT DOCUMENTS

| | | | |
|---|---|---|---|
| 7,082,531 B1 * | 7/2006 | Chen et al. ..................... | 713/153 |
| 7,353,390 B2 * | 4/2008 | Chandley et al. ............. | 713/168 |
| 2002/0199116 A1 * | 12/2002 | Hoene et al. .................. | 713/201 |
| 2003/0055968 A1 * | 3/2003 | Hochmuth et al. ........... | 709/226 |
| 2003/0105973 A1 * | 6/2003 | Liang et al. ................... | 713/200 |
| 2005/0278784 A1 * | 12/2005 | Gupta et al. ................... | 726/23 |
| 2006/0031921 A1 * | 2/2006 | Danforth et al. .................. | 726/1 |
| 2006/0095961 A1 * | 5/2006 | Govindarajan et al. ......... | 726/15 |
| 2006/0101409 A1 * | 5/2006 | Bemmel ...................... | 717/126 |

* cited by examiner

*Primary Examiner* — Kambiz Zand
*Assistant Examiner* — Aubrey Wyszynski
(74) *Attorney, Agent, or Firm* — Barnes & Thornburg LLP

(57) ABSTRACT

The present application relates to virus control in a network. An illustrative embodiment provides a network including a plurality of processing devices and at least one virus control server configured to quarantine a selected processing device from the network by assigning the selected processing device to a unique quarantine sub-network upon the occurrence of a first quarantine event such that all network traffic to and from the selected device must pass through the virus control server.

37 Claims, 4 Drawing Sheets

NETWORK BASED VIRUS CONTROL

COPYRIGHT NOTICE

A portion of the disclosure of this patent contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD OF THE INVENTION

The present invention relates to controlling viruses in a network.

BACKGROUND OF THE INVENTION

In recent times the rapid spread of viruses such as Netsky and Mydoom, and their variants, has highlighted the vulnerability of many users' computers and networks to virus attacks.

Securing a network against possible virus infection presents particular challenges due to the number of possible sources of introduction of a virus into the network. Moreover, because each of the devices on a network may have different versions or revisions of virus scanning software or operating system a wide range of vulnerabilities may exist on the network. Networks in which devices are removed and then subsequently reconnected to the network have even greater risk of infection as each reconnection to the network provides a new opportunity for a virus to be introduced into the network.

Proposals to curtail the spread of viruses within a network introduced by the connection of a new device to the network in the past have typically involved quarantining all newly introduced devices in a remediation Virtual Local Area Network (VLAN) whilst they are scanned for viruses and any necessary virus removal is undertaken. However, this is not an optimal solution since viruses are able to spread through the devices quarantined in the remediation VLAN. Additionally, because devices quarantined to the remediation VLAN are not able to access the remainder of the network, their usefulness and hence user productivity is dramatically reduced.

SUMMARY OF THE INVENTION

In a first aspect the present invention provides a virus control server for use in a network including a plurality of processing devices; said virus control server being configured to quarantine a selected processing device from the network by assigning the selected processing device to a unique quarantine sub-network upon the occurrence of a first quarantine event such that all network traffic to and from a selected device must pass through the virus control server.

The virus control server can be further configured to assign a security policy to the selected device for regulating network traffic between the selected device and devices outside the selected device's quarantine sub-network.

On the occurrence of a first quarantine event the virus control server can be further configured to assign an IP address and sub-network to quarantine the device.

Preferably, upon the occurrence of a second quarantine event the virus control server is configured to release the selected device from its quarantine sub-network such that at least some network traffic to and from the selected device bypasses the virus control server. The virus control server can be configured to reassign the IP address and sub-network of the selected device to release the selected device from quarantine.

Preferably the virus control server uses DHCP to assign an IP address to the selected device.

The virus control server is configured to quarantine a selected device upon the occurrence of at least one of the following first quarantine events: a first connection of the selected device to the network; a re-connection of the selected device to the network; the detection of a virus on the selected device; the identification of a virus to which the selected device may be vulnerable.

The virus control server can be further configured to communicate with a virus control agent of the selected device to determine the occurrence of a first quarantine event.

The virus control server can be configured to release quarantine a selected device upon the occurrence of at least one of the following second quarantine events: the elapsing of a predetermined quarantine period; receipt of verification that the selected device is free of viruses. The virus control server can be configured to communicate with a virus control agent of the selected device to determine the occurrence of a second quarantine event.

The virus control server can be further configured to place the selected device into group quarantine sub-network, such that network traffic between the selected and a device outside the group quarantine sub-network passes through the virus control server, and at least some network traffic between the selected device and a device within the group quarantine sub-network bypasses the virus control server, upon the occurrence of a third quarantine event.

A third quarantine event can include one of the following events; the detection, by the virus control server, of a device type corresponding to the selected device; the detection, by the virus control server, of an operating system type of the selected device; the detection, by the vim control server, that the selected device does not have a virus control agent of a predetermined type.

The virus control server can be further configured to conduct a virus scan on the selected device.

In a second aspect there is provided a network including a plurality of processing devices and at least one virus control server configured to quarantine a selected processing device from the network by assigning the selected processing device to a unique quarantine sub-network upon the occurrence of a first quarantine event such that all network traffic to and from the selected device must pass through the virus control server.

The virus control server can preferably be configured to assign a security policy to the selected device for regulating network traffic between the selected device and devices outside the selected device's quarantine sub-network.

Preferably each processing device of the network is connected to the network via an access port, and wherein, on the occurrence of a first quarantine event the virus control server is configured to assign a network address and access port to the selected device to define the device's unique quarantine sub-network.

Upon the occurrence of a second quarantine event the virus control server can be configured to release the selected device from its quarantine sub-network such that at least some network traffic to and from the selected device bypasses the virus control server. The virus control server can also be configured to reassign the network address and access port of the selected device to release the selected device from said quarantine sub-network.

The virus control server is preferably configured to quarantine a selected device upon the occurrence of at least one of the following first quarantine events: a first connection of the selected device to the network; a re-connection of the selected device to the network; the detection of a virus on the selected device; the identification of a virus to which the selected device may be vulnerable.

The virus control server can also be configured to release quarantine a selected device upon the occurrence of at least one of the following second quarantine events: the elapsing of a predetermined quarantine period; receipt of verification that the selected device is free of viruses.

The selected device preferably includes a virus control agent configured communicate a virus control status to the virus control server. The virus control agent can be configured to enable the virus control server to access a file system of the device.

The virus control server can be configured to place the selected device into a group quarantine sub-network, such that network traffic between the selected and a device outside the group quarantine sub-network passes through the virus control server, and at least some network traffic between the selected device and a device within the group quarantine sub-network bypasses the virus control server, upon the occurrence of a third quarantine event. The third quarantine event can includes any one of the following events: the detection, by the virus control server, of a device type corresponding to the selected device; the detection, by the virus control server, of an operating system type of the selected device; and the detection, by the virus control server, that the selected device does not have a virus control agent of a predetermined type.

In a third aspect the present invention provides a method for controlling viruses in a network comprising: detecting a first quarantine event relating to at least one selected device; and quarantining the selected device within a unique quarantine sub-network of the network; such that all network traffic to and from the selected device is communicated via a virus control server.

The method can additionally include, filtering at least selected network traffic to and from the selected device within the virus control server.

Preferably the method additionally includes, selectively allowing communication between the selected device and the remainder of the network during quarantine of the selected device.

The method can additionally include, detecting a second quarantine event relating to the selected device; and releasing the selected device from its unique quarantine sub-network such that at least some network traffic to and from the selected device bypasses the virus control server.

In an embodiment the step of quarantining the selected device includes, assigning a network address and sub-network the selected device.

Releasing the selected device from its unique quarantine sub-network can include reassigning the network address and sub-network of the selected device to release the selected device from said quarantine sub-network.

A first quarantine event can be selected from a list including, a first connection of the selected device to the network; a re-connection of the selected device to the network; the detection of a virus on the selected device; the identification of a virus to which the selected device may be vulnerable.

A second quarantine event can be selected from a list including: the elapsing of a predetermined quarantine period; receipt of verification that the selected device is free of viruses.

The method can additionally include: detecting a third quarantine event relating to the selected device; and reassigning the selected device into a group quarantine sub-network, such that network traffic between the selected and a device outside the group quarantine sub-network passes through the virus control server, and at least some network traffic between the selected device and a device within the group quarantine sub-network bypasses the virus control server, upon the occurrence of a third quarantine event. The third quarantine event can be include: detecting a type of the selected device; detecting data representative of an operating system of the selected device; and detecting data representative of one or more software programs residing on the selected device.

The method can additionally includes scanning at least a portion of a file system of the selected device for viruses.

A network can be, but is not intended to be limited to, a computer network, a data network, telecommunications network or a converged network, and may include wired or wireless communications links or a combination of both.

BRIEF DESCRIPTION OF THE DRAWINGS

Illustrative embodiments of the present invention will now be described by way of non-limiting example only with reference to the accompanying drawings, in which.

DETAILED DESCRIPTION OF THE EMBODIMENTS

Figure 1:
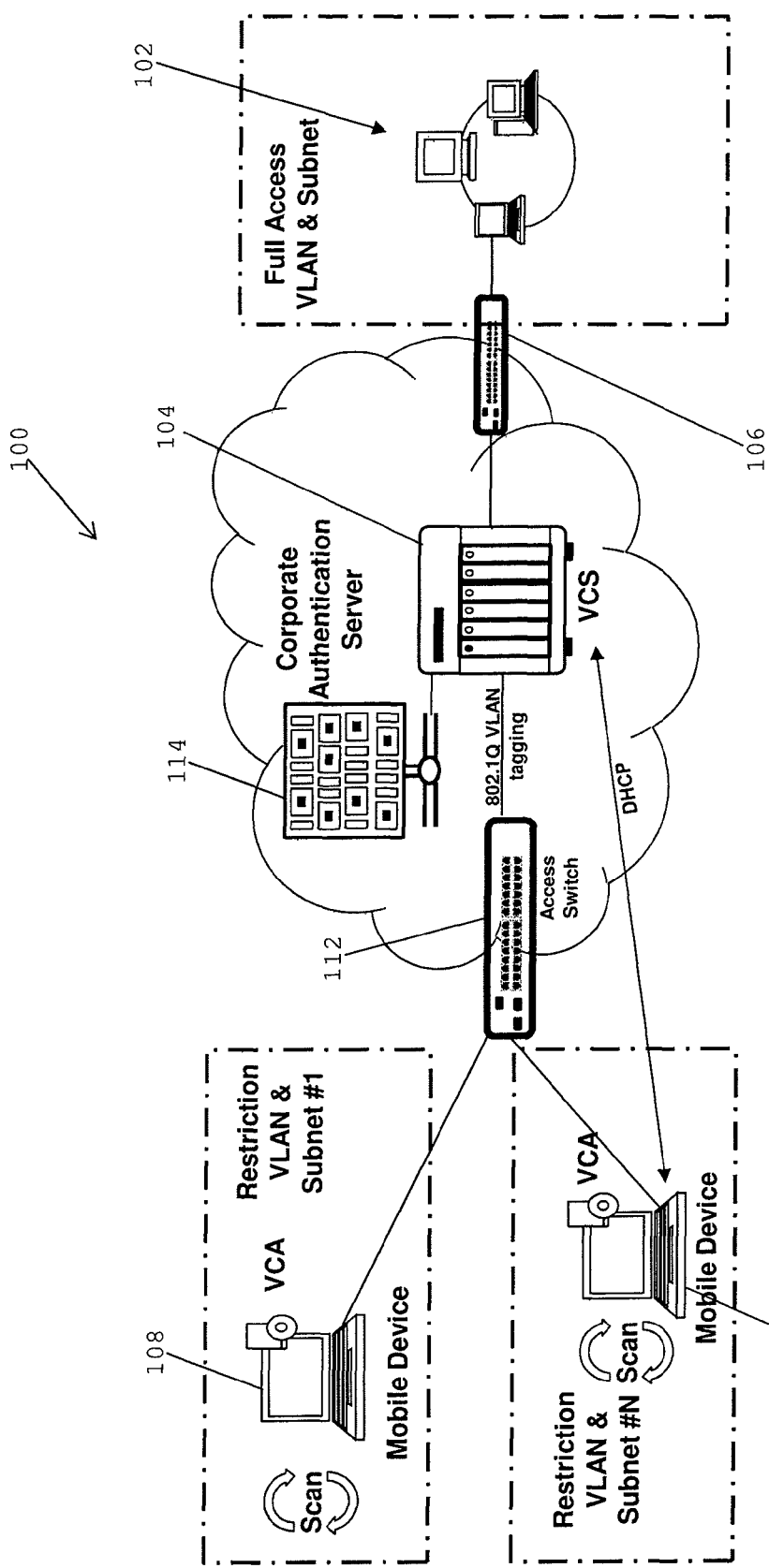
FIG. 1 shows an illustrative embodiment of a network employing a virus control server according to a first embodiment of the present invention.

FIG. 1 depicts a network 100 which includes a plurality of processing devices connected to a network server. The network 100 may also include a plurality of peripheral devices such as printers, scanners or the like (not shown) to enable various types of inputs and output to be obtained from the devices of the network.

As will be appreciated, from time to time new devices will need to be added to network 100 or other events will occur that will increase the risk that one or more devices on the network 100 can be affected by a virus. When such an event occurs the connection of affected devices to the network may pose a security risk to the entire network. An example of such a scenario occurs when a device such as a laptop computer or personal digital assistant are reintroduced to the network after being disconnected from the network, or when a new device is connected to the network for the first time. In these situations there is a security risk to the network 100 in permitting connection of the newly introduced device to the network 100 since during the time in which it was not connected to the network it may have acquired a virus.

In order to mitigate the risk of the device introducing any viruses to the rest of the network 100, the network 100 is divided into one or more VLANs, defined according to IP address subnet. The VLANs are used to group devices according to the level of risk that they pose to the rest of the network 100. In the present example the primary VLAN, is known as the full access VLAN 102. Each device within the full access VLAN 102 has the ability to communicate with each other device. The network 100 may also be configured to communicate with external networks or devices, via a virtual private network (VPN) or the like. In this situation devices within the full access VLAN 102 can be given access to these external networks or devices. In an ideal situation all devices in the network would operate in the full access VLAN 102 and have full access to all devices in communication with the network. In contrast to this, infected or potentially infected devices are quarantined into their own VLANs until they can be safely connected to the remainder of the network.

FIG. 1 depicts the situation in which two devices 108 and 110 are being introduced (or reintroduced) to the network 100.

Access to the network 100 for newly introduced devices is controlled by a virus control server (VCS) 104. The virus control server 104 is connected to the full access VLAN 102 via an access switch 106. Devices wishing to connect to the network 100, such as devices 108 and 110 do so via the access switch 112. The access switch 112 is, in turn, connected to, and controlled by, the virus control server 104.

It should be noted that access switch 106 has been shown as a distinct device to access switch 112 for ease of description. However in reality they may be the same access switch with certain access ports being assigned to the full access sub-network 102 e.g. ports to which trusted devices are connected, and certain other ports e.g. ports with no device connected, or ports to which an "un-trusted" device is connected, being assigned to quarantine sub-networks as described herein.

The virus control server 104 is configured to ensure that all of the ports on the access control switches 112 are initially set to their own unique VLAN, whereupon anytime a device connects to the network 100 it is immediately quarantined on its own quarantine VLAN. In the present example, when device 108 connects to access switch 112 it is quarantined in sub-network number 1 and device 110 is quarantined in sub-network N. In connecting to the network the devices 108 and 110 have their respective IP addresses and default gateways assigned by the virus control server 104. Advantageously the virus control server 104 uses DHCP to assign IP addresses to the devices of the network 100.

In order for the devices connected of the network 100 to communicate their virus infection or security patch status to the virus control server 104 each device eg 108 and 110 has a resident application operating as a virus control agent (VCA). The VCA on each device 108 or 110 is configured to scan for viruses and undertake any necessary rectification action in order to remove the viruses and/or repair any damage to software or data structures caused by a virus infection.

The VCA residing on the devices 108 and 110 also indicates upon connection to the network 100 (and possibly periodically thereafter) the virus status of the device e.g. whether viruses or items of malicious software have been detected or the date of last revision of virus definitions on the device. In an alternative embodiment the VCA enables remote scanning of the device by a device on the network (for example the VCS). In this embodiment the VCA provides access to the device's file system to enable the scan to be executed remotely.

On first attachment of the device eg 108 or 110 to the network 100 the user of the device is prompted to authenticate the connection. In order to allow this to take place the virus control server 104 is in data communication with a network authentication server 114. The actual mechanism for authentication via the network authentication server 114 is not important. However, authentication is conducted to ensure that the device being attached to the network eg. 108 or 110 does not have a virus which is masquerading as a virus control agent.

Advantageously, by confining individual devices to their own respective quarantined sub-networks within the network 100 the virus control server 104 prevents cross infection of viruses between devices and enables a security policy to be applied to individual devices. Moreover, because each device in a quarantine network has the virus control server 104 acting as its default gateway to the network 100 the device e.g. 110 only sees the VCS. Because of this, all traffic to and from the quarantined device, including communications with other quarantined devices, must pass through the virus control server meaning that every data packet sent to and from the quarantined devices can be inspected if necessary to implement security policy.

In this regard, during virus scanning and remediation the virus control server 104 maintains a security policy for each device. The security policy allows the virus control server to enable a device within a quarantine sub-network eg device 110 to have certain limited types of communications with devices in the full access parts of the network 102. For example, quarantined device eg 110 can be allowed to receive incoming email and send certain types of documents to printers, or may be granted read-only access to certain networked drives. Other forms of appropriate access will be known to those skilled in the art. By allowing this restricted access to the network during quarantine, the user of the quarantined device 110 maintains at least some level of productivity.

Figure 2:
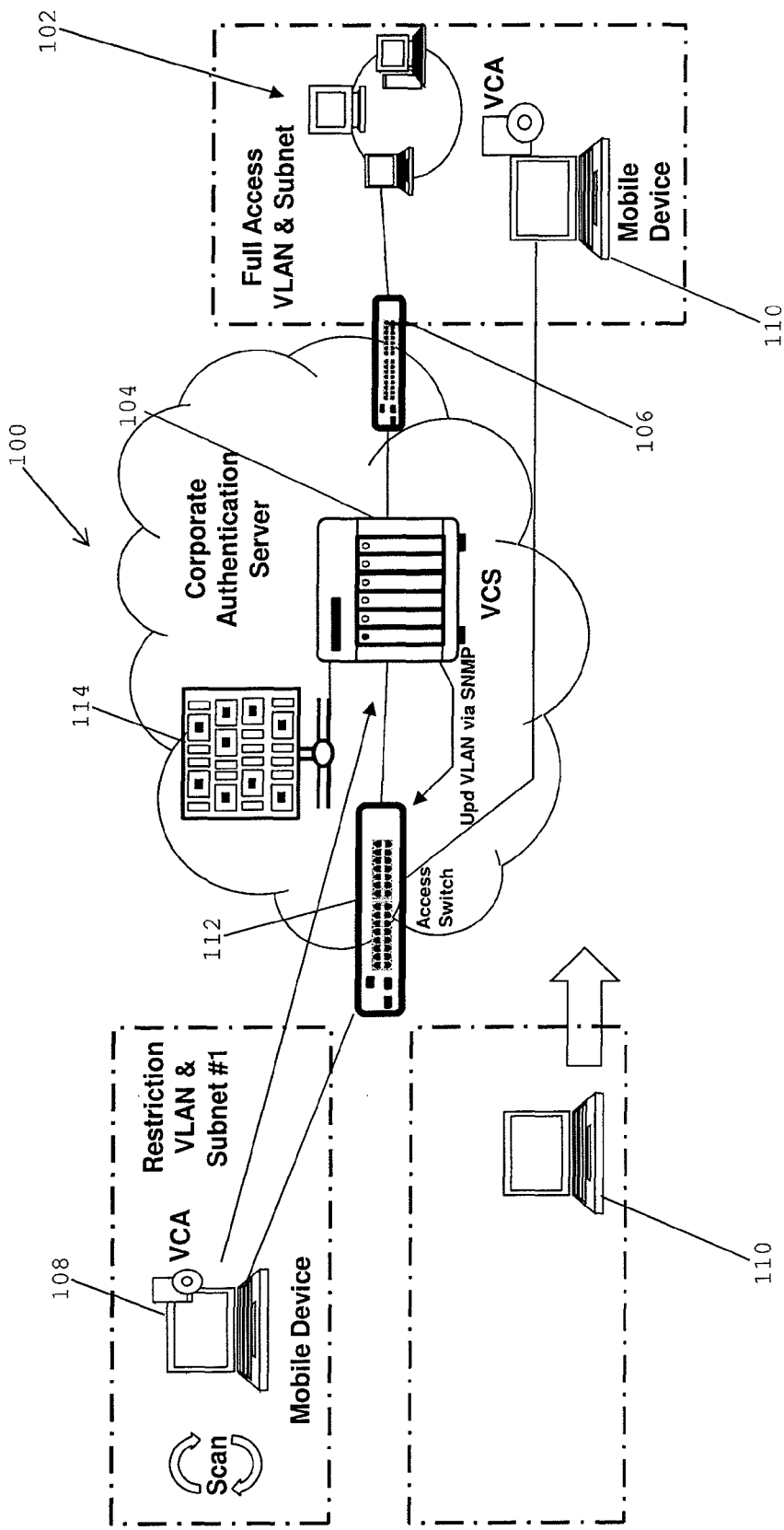
FIG. 2 shows the network of the embodiment of FIG. 1 and illustrates the release of a device from a quarantine sub-network.

Turning now to FIG. 2 which depicts a process for releasing a quarantined device from its quarantine VLAN. Upon the occurrence of a predetermined quarantine event, such as the completion of virus scanning and remediation by the virus control agent, a quarantined device eg 110 is released from its quarantine VLAN.

since the assignment of IP addresses is performed by the virus control server 104 using DHCP, the timely release of devices from quarantine can be facilitated by keeping DHCP lease times short for the devices within quarantine VLAN. Quarantined devices eg 110 can be reassigned to the main network as soon as possible. Alternatively, when a quarantine device is cleaned its virus control agent can report this to the virus control server 104 or force a DHCP renewal in order to have the device eg 110 released from its quarantine VLAN. When such a second quarantining event occurs the virus control server allocates a new IP address to the previously quarantined device eg, 110, which resides in the full access VLAN 102 of the network 100 and reprograms the access switch port 112 via SNMP such that the device 110 becomes part of the full access sub-network 102. Appendix 1 discloses an example of an SNMP message used on a Nortel Networks "Baystack" to control a port's VLAN membership. As will be appreciated by those skilled in the art the exact field will vary based on the device used as the access switch.

As depicted in FIG. 2 the device 110 now becomes part of the full access sub-network 102 and may operate within that sub-network 102 without the data transport bottleneck of the virus control server 104 being applied.

Figure 3:
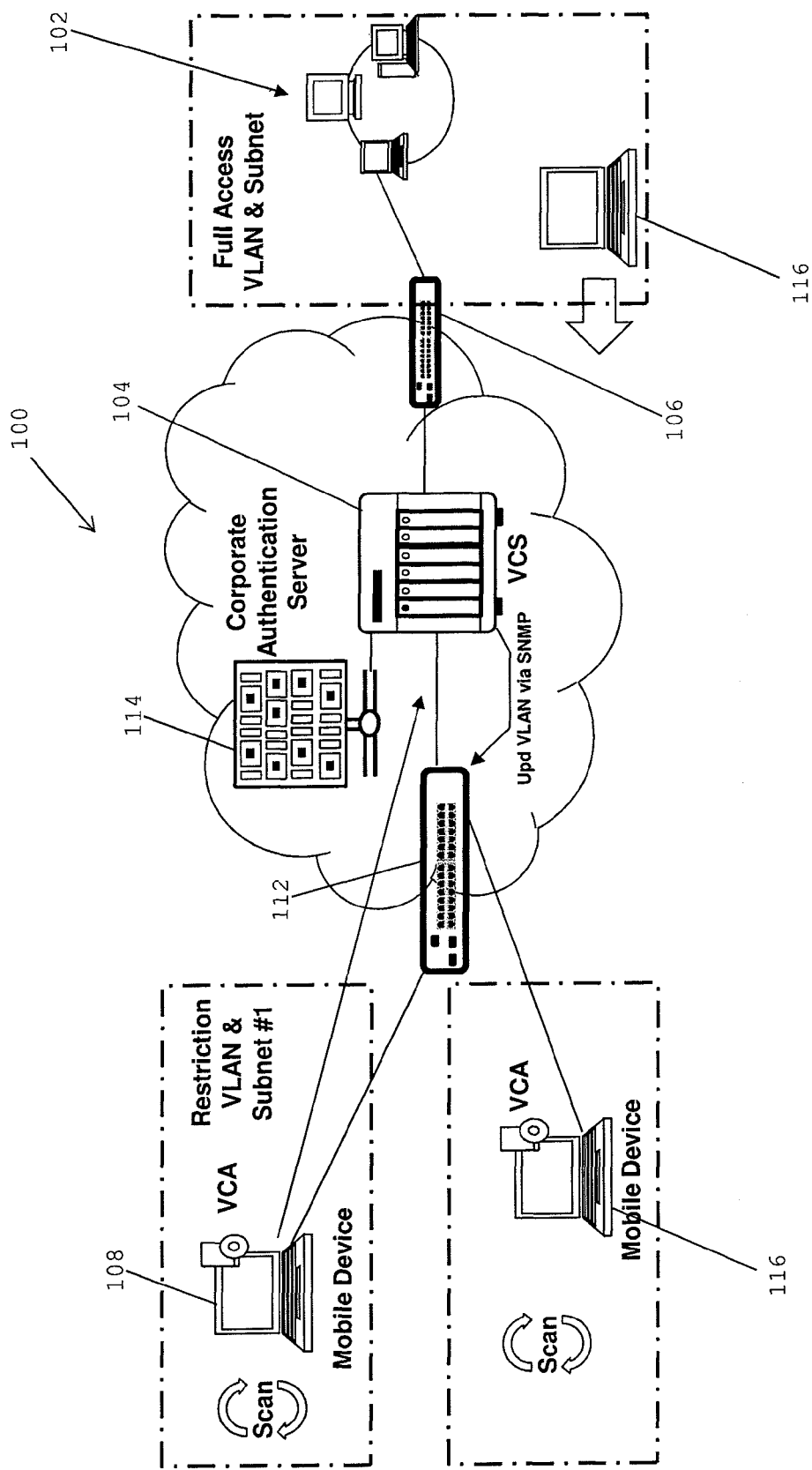
FIG. 3 illustrates the operation of the network of FIG. 1 illustrating an emergency quarantine procedure in accordance with an embodiment of the present invention.

In certain circumstances it may become necessary to quarantine one or more devices which are part of the full access sub-network 102 of the network 100 as illustrated in FIG. 3. The need to quarantine a devices (or devices) may arise because of a virus is detected on a device, or due to a large scale virus outbreak or the publication of a new operating system vulnerability etc.

Candidate devices on the network 100 for a restriction in a quarantine sub-network may be selected on the basis of a wide range of factors including, but not limited to, detection of a virus on the device, operating system revision, the date of last virus scan, virus control agent version number or the date of most recent update of the virus control agent or virus scanning software.

Upon the occurrence of a quarantine event which requires the quarantining of one or more devices which are already part of the full access sub-network 102 the virus control server can be configured to reallocate IP addresses and default gateways for selected machines such that all traffic, to and from these device(s), again passes through the VCS. In order to initiate the quarantining of a device the virus control agent may be used to force a DHCP renewal for the selected device 116, or alternatively, the next time a lease renewal is required for a selected machine 116 the virus control server 104 reallocates its IP address and access port so that it is quarantined. As will be appreciated by those skilled in the art the updating of the default gateway at the access switch 112 takes place via an SNMP message from the virus control server 104 to the access switch 112.

Figure 4:
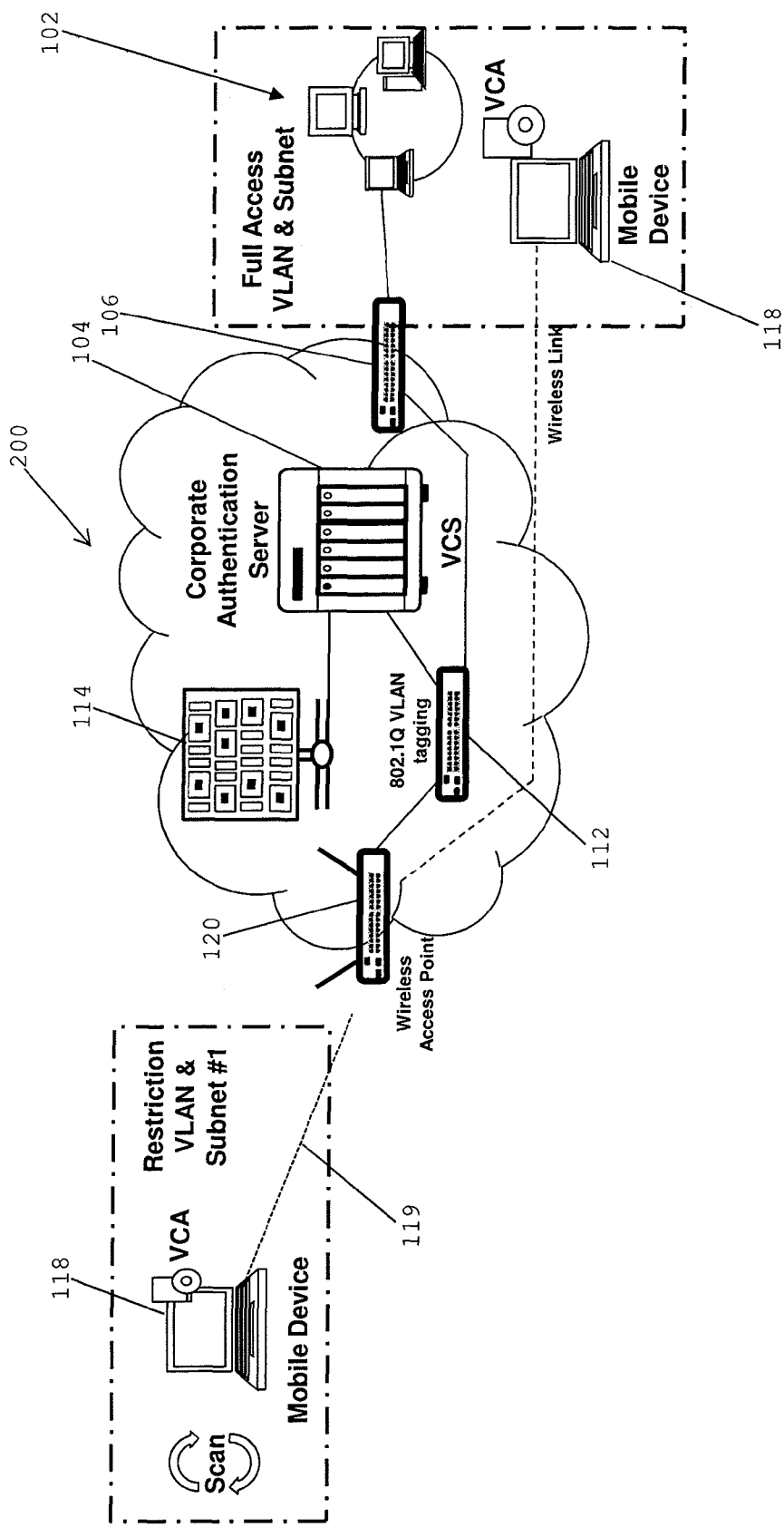
FIG. 4 depicts a network according to a second embodiment of the present invention.

FIG. 4 shows a further embodiment of the present invention in which a device 118 accesses the network 200 via a wireless connection 119. On first attachment to the network the device 118 connects to a wireless access point 120. The wireless access point is connected to the access switch 112. The wireless access point 120 and/or the access switch 112 are configured to allow association of a client device eg 118 by its MAC address to a given VLAN. In this way the virus control server 104 configures the access point 120 to associate the wireless device 118 initially to a quarantine VLAN as described in connection with the previous embodiments. After the requisite scanning and/or removal of any viruses or other security issues that the wireless device 118 may have, the virus control server 104 can reassign the device to the full access VLAN 10 by reassigning the device's 118 and access port and IP address as described above. As described in connection with the previous embodiment the virus control server 104 is able to filter all packets transmitted to and from the wireless device 118 in the present arrangement and accordingly restricted access to certain other networkable devices can safely be provided.

The above mentioned embodiments prevent cross infection of quarantined devices and advantageously cannot be circumvented by the end user changing the IP address of a quarantine machine. The administrator of the virus control server 104 is able to allow restricted network access rather than blocking access, which means that users of quarantined devices retain some level of productivity and network access. Moreover, visiting devices can be allowed onto the network via their own quarantined VLAN and be provided with a limited level of access to certain networked devices such as printers and scanners or the like.

The flexibility of the system means that a wide range of factors can be used to create quarantine triggers, which either place a device into, or release a device from quarantine. For example, client software version or operating system (OS) finger printing or port scanning can be used as triggers to determine the level of access to apply to a particular device, or whether to grant unrestricted access to the network for a device. In the event that a device does not have a VSA, OS fingerprinting can be used to trigger assignment of a device to a group VLAN. For example, OS fingerprinting can be used to determine that a particular device is a WiFi phone running Symbian OS. This device can then be assigned to a VLAN for all phone devices. Access from this VLAN may still be restricted by the VCS or other firewall device.

In an alternative embodiment of the present invention the virus control agent may be implemented as a trusted Java applet in a web page. Upon first connection of a device to the network the device can be forced to access a website containing the virus control agent applet, until the device has been cleared as safe for unrestricted access to the network. This embodiment allows broad device coverage as the Java applet can be run on a wide range of platforms.

As will be appreciated the present invention is able to be used with a wide range of devices, including, but not limited to, computers, computer peripheral devices, personal digital assistants, mobile telephones, network devices such as routers etc.

It will be understood that the invention disclosed and defined in this specification extends to all alternative combinations of two or more of the individual features mentioned or evident from the text or drawings. All of these different combinations constitute various alternative aspects of the invention.

APPENDIX 1

SNMP Set Example for Controlling Access Port VLAN Membership
Name: rcVlanPortVlanIds
Type: OBJECT-TYPE
OID: 1.3.6.1.4.1.2272.1.3.3.1.3
Full Path:
iso(1).org(3).dod(6).internet(1).private(4).enterprises(1)
.rapidCity(2272).rcMgmt(1).rcVlan(3).rcVlanPortTable(3)
.rcVlanPortEntry(1).rcVlanPortVlanIds(3)
Module: RAPID-CITY
Parent rcVlanPortEntry
Previous sibling: rcVlanPortNumVlanIds
Next sibling: rcVlanPortType
Numerical syntax: Octets
Base syntax: OCTET STRING
Composed syntax: IdList
Status: mandatory
Max access: read-write
Size list: 1: 250
Description: An array used to identify which VLANs this port is assigned to. Each VLAN ID is stored as a two octet value. The first octet in the pair holds bits 15-8 of the VLAN ID, while the second octet holds bits 7-0 of the VLAN ID.

The invention claimed is:

1. A virus control server for use in a network including a plurality of processing devices; said virus control server being configured to quarantine a selected processing device from the network by assigning the selected processing device to a quarantine sub network upon the occurrence of a first quarantine event such that all network traffic to and from a selected device assigned to the quarantine sub network is routed through the virus control server for regulation by the server, wherein the first quarantine event includes detecting a virus on the selected device; and wherein the virus control server is further configured to conduct a virus scan on the selected device.

2. The virus control server of claim 1 which is further configured to assign a security policy to the selected device for regulating network traffic between the selected device and one or more devices outside the selected device's quarantine sub network.

3. The virus control server of claim 1 wherein on the occurrence of a first quarantine event the virus control server is configured to assign an IP address and sub network to quarantine the device.

4. The virus control server of claim 3 wherein the virus control server uses DHCP to assign an IP address to the selected device.

5. The virus control server of claim 1 wherein on the occurrence of a second quarantine event the virus control server is configured to release the selected device from its quarantine sub network such that at least some network traffic to and from the selected device bypasses the virus control server.

6. The virus control server of claim 5 wherein the virus control server is configured to reassign an IP address and sub network of the selected device to release the selected device from quarantine.

7. The virus control server of claim 5 wherein the virus control server is configured to release quarantine a selected device upon the occurrence of at least one of the following second quarantine events:
 the elapsing of a predetermined quarantine period;
 receipt of verification that the selected device is free of viruses.

8. The virus control server of claim 5 wherein the virus control server is configured to communicate with a virus control agent of the selected device to determine the occurrence of a second quarantine event.

9. The virus control server of claim 1 wherein the virus control server is configured to communicate with a virus control agent of the selected device to determine the occurrence of a first quarantine event.

10. This virus control server of claim 5 wherein the virus control server is further configured to place the selected device into a group quarantine sub network, such that network traffic between the selected and a device outside the group quarantine sub network passes through the virus control server, and at least some network traffic between the selected device and a device within the group quarantine sub network bypasses the virus control server, upon the occurrence of a third quarantine event.

11. The virus control server of claim 10 wherein the third quarantine event is selected from one of the following events:
 the detection, by the virus control server, of a device type corresponding to the selected device;
 the detection, by the virus control server, of an operating system type of the selected device;
 the detection, by the virus control server, that the selected device does not have a virus control agent of a predetermined type.

12. A network including a plurality of processing devices and at least one virus control server configured to quarantine a selected processing device from the network by assigning the selected processing device to a unique quarantine sub network upon the occurrence of a first quarantine event such that all network traffic to and from the selected device assigned to the quarantine sub network is routed through the virus control server for regulation by the server, wherein the first quarantine event includes detecting a virus on the selected device; and wherein the virus control server is further configured to conduct a virus scan on the selected device.

13. The network of claim 12 wherein the virus control server is further configured to assign a security policy to the selected device for regulating network traffic between the selected device and devices outside the selected device's quarantine sub network.

14. The network of claim 12 wherein each processing device is connected to the network via an access port, and wherein, on the occurrence of a first quarantine event the virus control server is configured to assign a network address and access port to the selected device to define the device's unique quarantine sub network.

15. The network of claim 14 wherein on the occurrence of a second quarantine event the virus control server is configured to release the selected device from its quarantine sub network such that at least some network traffic to and from the selected device bypasses the virus control server.

16. The network of claim 15 wherein the virus control server is configured to reassign the network address and access port of the selected device to release the selected device from said quarantine sub network.

17. The network of claim 15 wherein the virus control server is configured to release quarantine a selected device upon the occurrence of at least one of the following second quarantine events:
 the elapsing of a predetermined quarantine period;
 receipt of verification that the selected device is free of viruses.

18. The network of claim 12 wherein the selected device includes a virus control agent configured to communicate a virus control status to the virus control server.

19. The network of claim 12 wherein the selected device includes a virus control agent configured to enable the virus control server to access a file system of the device.

20. The network of claim 12 wherein the virus control server is configured to place the selected device into a group quarantine sub network, such that network traffic between the selected and a device outside the group quarantine sub network passes through the virus control server, and at least some network traffic between the selected device and a device within the group quarantine sub network bypasses the virus control server, upon the occurrence of a third quarantine event.

21. The network of claim 20 wherein, the third quarantine event is any one of the following events:
 the detection, by the virus control server, of a device type corresponding to the selected device;
 the detection, by the virus control server, of an operating system type of the selected device; and
 the detection, by the virus control server, that the selected device does not have a virus control agent of a predetermined type.

22. A method for controlling viruses in a network comprising:
 detecting a first quarantine event relating to at least one selected device; and
 quarantining the selected device within a unique quarantine sub network of the network; such that all network traffic to and from the selected device is communicated via a virus control server, wherein the first quarantine event includes detecting a virus on the selected device; and
 wherein the virus control server is further configured to conduct a virus scan on the selected device.

23. The method of claim 22 wherein the method additionally includes: filtering at least selected network traffic to and from the selected device within the virus control server.

24. The method of claim 23 wherein the method additionally includes: selectively allowing communication between the selected device and the remainder of the network during quarantine of the selected device.

25. The method of claim 22 wherein the method additionally includes:
 detecting a second quarantine event relating to the selected device; and
 releasing the selected device from its unique quarantine sub network such that at least some network traffic to and from the selected device bypasses the virus control server.

26. The method of claim 25 wherein releasing the selected device from its unique quarantine sub network includes reassigning the network address and a sub network of the selected device to release the selected device from said quarantine sub network.

27. The method of claim 25 wherein the second quarantine event is selected from a list including:
the elapsing of a predetermined quarantine period;
receipt of verification that the selected device is free of viruses.

28. The method of claim 22 wherein the step of quarantining the selected device includes:
assigning a network address and sub network the selected device.

29. The method of claim 22 wherein the first quarantine event is selected from a list including:
a first connection of the selected device to the network;
a reconnection of the selected device to the network;
the detection of a virus on the selected device;
the identification of a virus to which the selected device may be vulnerable.

30. The method of claim 22 wherein third quarantine event is selected from the following:
detecting a type of the selected device;
detecting data representative of an operating system of the selected device; and
detecting data representative of one or more software programs residing on the selected device.

31. The method of claim 22 wherein the method additionally includes scanning at least a portion of a file system of the selected device for viruses.

32. A non-transitory computer program residing on a computer readable medium comprising a set of instructions configured to control the operation of a computing device which is part of a network of devices, to:
detect a first quarantine event relating to at least one selected device; and
quarantine the selected device within a unique quarantine sub network of the network; such that all network traffic to and from the selected device within the quarantine sub network is communicated via a virus control server, wherein the first quarantine event includes detecting a virus on the selected device; and
wherein the virus control server is further configured to conduct a virus scan on the selected device.

33. The computer program of claim 32 wherein the computing device is further caused to filter at least selected network traffic to and from the selected device.

34. The computer program of claim 32 wherein the computing device is further caused to selectively allow communication between the selected device and the remainder of the network during quarantine of the selected device.

35. The computer program of claim 32 wherein the computing device is further caused to:
detect a second quarantine event relating to the selected device; and
release the selected device from its unique quarantine sub network such that at least some network traffic to and from the selected device bypasses the computing device.

36. The computer program of claim 32 wherein the computing device is further caused to:
detect a third quarantine event relating to the selected device; and
reassign the selected device into a group quarantine sub network, such that network traffic between the selected and a device outside the group quarantine sub network passes through the computing device, and at least some network traffic between the selected device and a device within the group quarantine sub network bypasses the computing device, upon the occurrence of a third quarantine event.

37. The computer program of claim 32 wherein the computing device is further caused to scan at least a portion of a file system of the selected device for viruses.

* * * * *